Figure 1:
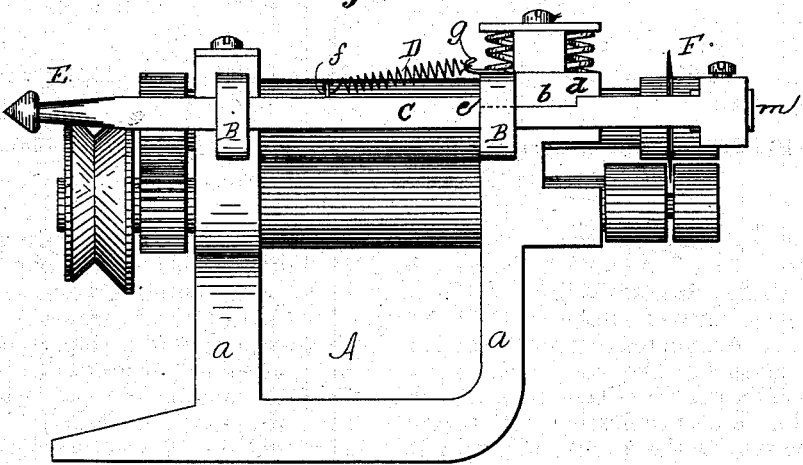

(No Model.)

A. WRIGHT.
DEVICE FOR SHARPENING THE BLADES OF FABRIC SEAM TRIMMERS.

No. 291,459.  Patented Jan. 1, 1884.

WITNESSES
Chas. R. Burr
W. E. Bowen

INVENTOR
Aaron Wright
by Frank Sheehy
Attorney

United States Patent Office.

AARON WRIGHT, OF PHŒNIX MILLS, NEW YORK, ASSIGNOR OF ONE-HALF TO EDWIN GROAT, OF SAME PLACE.

DEVICE FOR SHARPENING THE BLADES OF FABRIC-SEAM TRIMMERS.

SPECIFICATION forming part of Letters Patent No. 291,459, dated January 1, 1884.

Application filed October 24, 1883. (No model.)

*To all whom it may concern:*

Be it known that I, AARON WRIGHT, a citizen of the United States, residing at Phœnix Mills, in the county of Otsego and State of New York, have invented certain new and useful Improvements in Devices for Sharpening the Blades of Fabric-Seam Trimmers, of which the following is a specification, reference being had therein to the accompanying drawings.

This invention has relation to improvements in devices for sharpening the cutting blades or disks of fabric-seam trimmers used in connection with sewing-machines, and is more especially adapted for use in connection with a trimmer for which I have this day made application for Letters Patent, and in the drawings hereto annexed have shown sufficient thereof to illustrate the manner of its attachment and operation.

Figure 2:
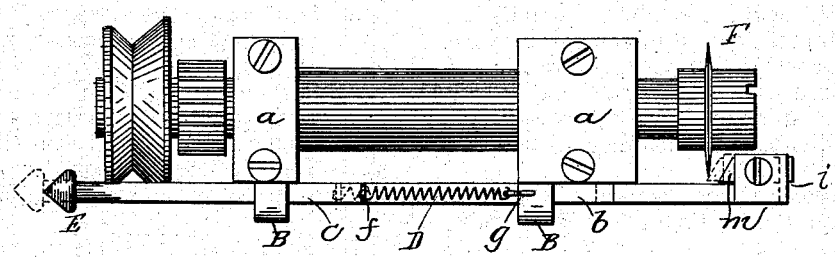
Figure 3:
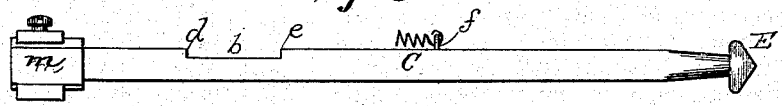
Figure 4:

In the accompanying drawings, Figure 1 is an elevation; Fig. 2, a plan, and Figs. 3 and 4 detail views.

A indicates a frame or casting, which may be so secured to the table or other convenient part of a machine that the roller carrying the cutting-disk will be brought on a level, or nearly so, with the cloth-plate of the machine, so as to receive the cloth as it leaves the needle. To the standards $a$ $a$ of this frame are secured lateral loops or brackets B B, for supporting the horizontal bar C of the sharpening apparatus. This bar C is provided on its upper edge with a transverse elongated slot, $b$, the recessed portion of which is encircled by one of the said loops, so that its shoulders $d$ and $e$ will abut against the loop and serve as a stop for the bar C in its backward and forward movements.

Upon the upper edge of the bar C, as at $f$, is an eye or hook, and upon the loop on the forward standard, $a$, a similar hook, $g$, to which the respective ends of the spiral spring D are secured, when the same is in an expanded position, so that the forward end of the bar C, carrying the sharpening material, in its normal position will stand off from the cutting-disk F, as shown in Figs. 1 and 2. The forward end of the bar C is provided with a longitudinal groove, $i$, which is preferably of dovetail form, for receiving the emery or other suitable sharpening material, $m$, and a threaded perforation to receive a thumb-screw for holding the said material in place. The opposite end of this bar may be provided with a handle, E, or other means by which it may be conveniently grasped by the operator.

This device can be very cheaply manufactured, it is simple in construction, and can be applied to a trimmer without impairing its validity in any manner whatever.

When the cutting apparatus is in operation, the sharpener assumes the position shown in Fig. 1 of the drawings; but when it is found desirable to sharpen the cutting-disk, the bar C is grasped at its handle portion, and the sharpening material brought in engagement with the disk, as shown by dotted lines in Fig. 2.

Having thus described my invention, what I claim as new, and desire to secure by Letters Patent, is—

1. The bar C, having the recess $b$, the hook $f$, the groove $i$, for holding the sharpening material, and perforation for receiving the set-screw, in combination with the loops B B, spring D, and hook $g$ of a seam-trimmer frame, substantially as specified.

2. The combination, with the cutting-disk and frame A of a fabric-seam trimmer having the loops B, of the sharpening apparatus consisting of the bar C, having recess $b$, handle E, hook $f$, groove $i$, for receiving the sharpening material, the threaded perforation for receiving the set-screw, and the spiral spring D, all adapted to operate substantially as specified.

In testimony whereof I have affixed my signature in presence of two witnesses.

AARON WRIGHT.

Witnesses:
GEORGE BROOKS,
C. R. BURCH.